(12) United States Patent
Kim

(10) Patent No.: US 10,133,391 B2
(45) Date of Patent: Nov. 20, 2018

(54) TOUCH SENSOR AND DISPLAY DEVICE HAVING THE SAME

(71) Applicant: Samsung Display Co., Ltd., Yongin-si, Gyeonggi-do (KR)

(72) Inventor: Dae Won Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/640,900

(22) Filed: Jul. 3, 2017

(65) Prior Publication Data

US 2018/0011581 A1    Jan. 11, 2018

(30) Foreign Application Priority Data

Jul. 5, 2016 (KR) .......................... 10-2016-0085016

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04106* (2013.01); *G06F 2203/04111* (2013.01); *G06F 2203/04112* (2013.01)

(58) Field of Classification Search
CPC .................. G06F 3/0414; G06F 3/044; G06F 2203/04104
See application file for complete search history.

(56) References Cited

U.S. PATENT DOCUMENTS

| 2014/0168139 A1* | 6/2014 | Ku ........................... G09G 3/20 345/174 |
| 2014/0204285 A1* | 7/2014 | Jang ........................ G06F 3/044 349/12 |
| 2015/0162908 A1 | 6/2015 | Hsu |
| 2017/0010730 A1* | 1/2017 | Chuang ................. G06F 3/0414 |

FOREIGN PATENT DOCUMENTS

| KR | 10-1336252 B1 | 12/2013 |
| KR | 10-1535426 B1 | 7/2015 |

* cited by examiner

*Primary Examiner* — Gerald Johnson
(74) *Attorney, Agent, or Firm* — Innovation Counsel LLP

(57) ABSTRACT

A touch sensor includes first electrodes extending in a first direction, second electrodes spaced apart from the first electrodes and extending in a second direction to cross the first electrodes, at least one pressure sensor arranged at an intersection between at least one of the first electrodes and at least one of the second electrodes, and a sensor controller electrically connected to the first electrodes, the second electrodes, and the pressure sensor. The sensor controller is configured to detect a variation in capacitance between the first electrodes and the second electrodes to sense a touch position during a first period and detect a variation in capacitance between the at least one of the first electrodes or the at least one of the second electrodes and the pressure sensor to sense a touch pressure during a second period.

18 Claims, 8 Drawing Sheets

TOUCH SENSOR AND DISPLAY DEVICE HAVING THE SAME

RELATED APPLICATION

The present application claims priority under 35 U.S.C. 119(a) to Korean Patent Application No.10-2016-0085016, filed on Jul. 5, 2016, in the Korean Intellectual Property Office, the entire contents of which are incorporated herein by reference in their entirety.

BACKGROUND

1. Field

An aspect of the present disclosure relates to a touch sensor and a display device having the same.

2. Description of the Related Art

A touch sensor is one of information input devices and provided in a display device for use. A user inputs information by pressing or touching the touch sensor while viewing an image displayed on a screen of the display device. Accordingly, the user may use the display device more conveniently through the touch sensor.

Recently, there has been a growing demand for a touch sensor capable of sensing a pressure caused by a touch input in addition to a position of the touch input. Sensing a touch pressure in addition to a touch position provides a larger variety of functions to the user.

SUMMARY

Aspects of the present disclosure are directed to a touch sensor capable of sensing a touch pressure in addition to a touch position, and a display device having the same.

According to an aspect of the present disclosure, there is provided a touch sensor including a plurality of first electrodes extending in a first direction, a plurality of second electrodes spaced apart from the plurality of first electrodes and extending in a second direction to cross the plurality of first electrodes, at least one pressure sensor arranged at an intersection between at least one of the plurality of first electrodes and at least one of the plurality of second electrodes, and a sensor controller electrically connected to the plurality of first electrodes, the plurality of second electrodes, and the pressure sensor. The sensor controller may be configured to detect a variation in capacitance between the plurality of first electrodes and the plurality of second electrodes to sense a touch position during a first period, and detect a variation in capacitance between the at least one of the plurality of first electrodes or the at least one of the plurality of second electrodes and the pressure sensor to sense a touch pressure during a second period.

Each of the first electrodes may include a plurality of first sensing cells arranged in the first direction on a first layer and a plurality of connection units connecting the plurality of first sensing cells in the first direction and arranged on a second layer. Each of the second electrodes may include a plurality of second sensing cells arranged in the second direction and a plurality of second connection units connecting the plurality of second sensing cells in the second direction and arranged on the first layer.

The touch sensor may further include third connection units arranged between the first layer and the second layer, electrically connecting the first sensing cells and the first connection units, and formed of a different material from the first sensing cells and the first connection units.

The third connection units may be conductive buffer materials including conductive fillers.

The third connection units may be a silicon composition including conductive nanoparticles.

The touch sensor may further include an insulating film disposed between the first connection units and the second connection units, and an air gap arranged between the first connection units or the second connection units and the insulating film.

The second sensing cells may be arranged on the first layer and integrally connected with the second connection units.

The pressure sensor may be arranged between the at least one of the first electrodes and the at least one of the second electrodes and electrically connected to the at least one of the first electrodes or the at least one of the second electrodes.

The pressure sensor may be arranged on one surface of the at least one of the second electrodes towards the at least one of the first electrodes.

The pressure sensor may be electrically connected to the at least one of the second electrodes.

The sensor controller may be configured to supply driving signals to the first electrodes and receive sensing signals from the second electrodes during the first period, and supply driving signals to the first electrodes and receive a sensing signal from the at least one of the second electrodes connected to the pressure sensor during the second period.

The sensor controller may be configured to compare a sensing signal received from the at least one of the second electrodes during a kth second period with a sensing signal received from the at least one of the second electrodes during a (k+1)th second period to sense the touch pressure, where k is a natural number.

In addition, according to an aspect of the present disclosure, there is provided a display device including a display panel, and a touch sensor arranged in or around the display panel, wherein the touch sensor includes a plurality of first electrodes extending in a first direction, a plurality of second electrodes spaced apart from the plurality of first electrodes and extending in a second direction to cross the plurality of first electrodes, at least one pressure sensor arranged at an intersection between at least one of the plurality of first electrodes and at least one of the plurality of second electrodes, and a sensor controller electrically connected to the plurality of first electrodes, the plurality of second electrodes, and the pressure sensor. The sensor controller may be configured to detect a variation in capacitance between the at least one of the plurality of first electrodes or the at least one of the plurality of second electrodes and the pressure sensor to sense a touch pressure during a pressure sensing period.

The sensor controller may be configured to detect a variation in capacitance between the first electrodes and the second electrodes to sense a touch position during a touch sensing period.

The pressure sensing period and the touch sensing period may be alternately arranged.

The sensor controller may be configured to supply driving signals to the first electrodes or the second electrodes during a kth pressure sensing period and a (k+1)th pressure sensing period, respectively, where k is a natural number, detect a variation in capacitance between the at least one of the first electrodes or the at least one of the second electrodes and the pressure sensor, and sense the touch pressure in response to the variation in the capacitance.

Each of the first electrodes may include a plurality of first sensing cells arranged in the first direction on a first layer and a plurality of connection units connecting the plurality of first sensing cells in the first direction and arranged on a second layer. Each of the plurality of second electrodes may include a plurality of second sensing cells arranged in the second direction and arranged on the first layer and a plurality of second connection units connecting the plurality of second sensing cells in the second direction and arranged on the first layer. The touch sensor may further include an insulating film disposed between the plurality of first connection units and the plurality of second connection units and a plurality of third connection units arranged between the first layer and the second layer and electrically connecting the plurality of first sensing cells and the plurality of first connection units.

The third connection units may be formed of a different material from the first sensing cells and the first connection units.

DETAILED DESCRIPTION

Figure 1:
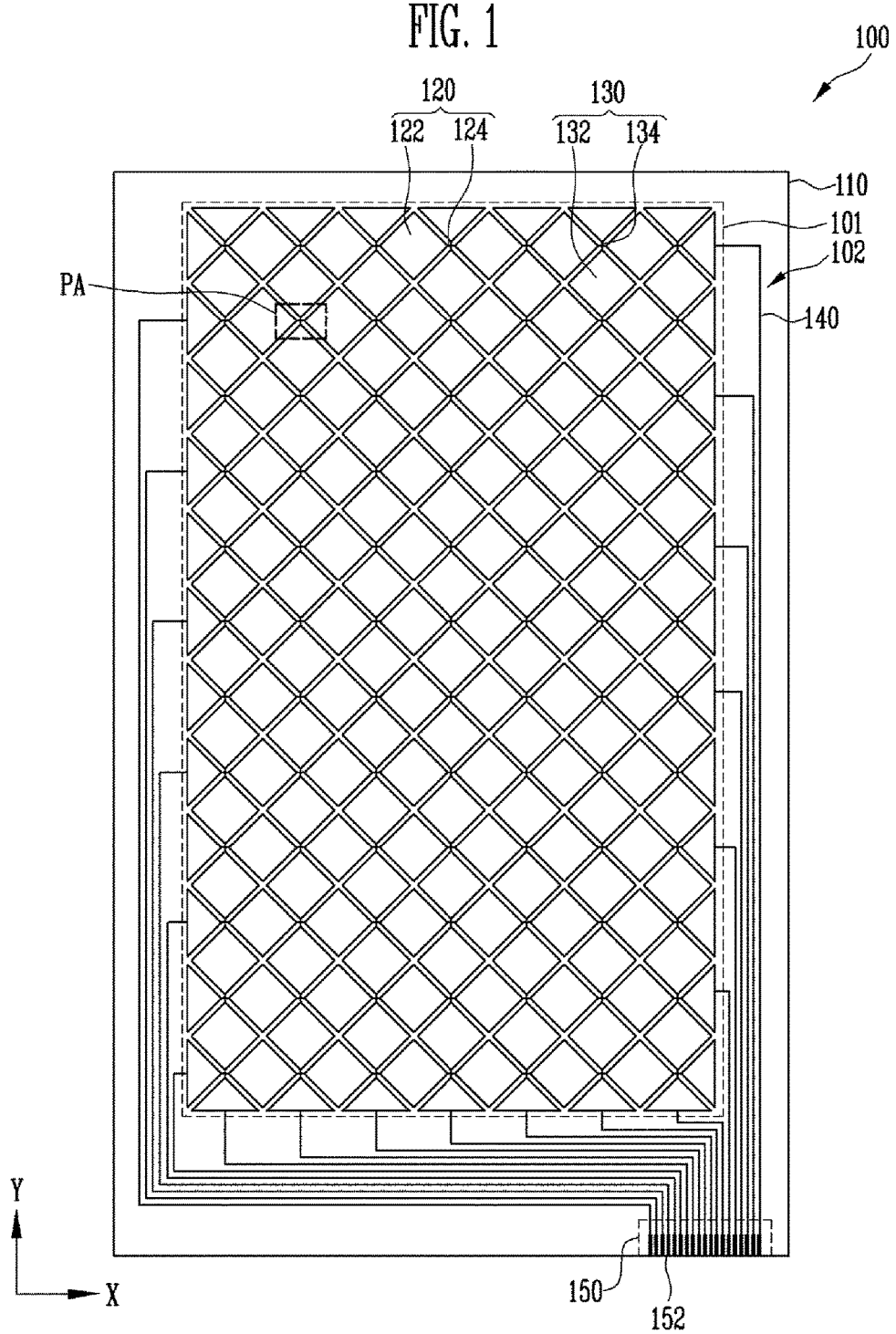
FIG. 1 is a view illustrating a touch sensor according to an embodiment of the present disclosure.

Hereinafter, embodiments of the present disclosure and other subject matters necessary for those skilled in the art to understand the contents of the present disclosure will be described in detail with reference to the accompanying drawings. However, the embodiments described below are merely illustrative, regardless of their representations. That is, the present disclosure is not limited to the embodiments described below, but may be modified into various forms. Further, in the following description, when a certain component is connected to another component, it refers to one component not only directly coupling another component but also indirectly coupling another component through an intermediate component.

Meanwhile, a portion of constituents that is not directly related to features of the present disclosure may be omitted in order to clearly illustrate the present disclosure. In addition, a portion of the constituents in the drawings may be shown in exaggerated sizes, ratios, and the like. In the drawings, the same or similar components are denoted by the same reference numerals and signs as possible although they are shown in different drawings.

FIG. 1 is a view illustrating a touch sensor according to an embodiment of the present disclosure. According to an embodiment, FIG. 1 illustrates a touch sensor having first and second electrodes including a plurality of diamond-shaped sensing cells disposed in an active area receiving a touch input, but the present disclosure is not limited thereto. For example, sensing cells may have another polygonal shape, a circular shape, or the like. In addition, the first and second electrodes may be formed in a rectangular bar shape in another embodiment.

Referring to FIG. 1, a touch sensor 100 according to an embodiment of the present disclosure may include a substrate 110, a plurality of first electrodes 120 and a plurality of second electrodes 130 crossing each other in an active area 101 on the substrate 110, a plurality of wires 140 disposed in an inactive area 102 around the active area 101 and connected to the first electrodes 120 and the second electrodes 130, and a pad unit 150 connected to the wires 140.

The substrate 110 may be made of an insulating material such as glass, resin, or the like. Further, the substrate 110 may be made of a material having flexibility so as to be bent or folded and have a single-layer structure or a multi-layer structure. For example, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and the like. However, the material forming the substrate 110 may be variously changed. For example, the substrate 110 may be made of fiber glass reinforced plastic (FRP) or the like.

In addition, according to an embodiment, the substrate 110 may be provided as an additional substrate for embodying the touch sensor 100, or as various components included in the display device. For example, the substrate 110 may be embodied as an encapsulation substrate, an encapsulation layer, a polarizing plate, or a window used in the display device.

The first electrodes 120 may extend in a first direction in the active area 101 on the substrate 110. According to an embodiment, the first direction may be a horizontal direction (an X direction). However, the present disclosure is not limited to this, and the first direction may be a vertical direction (a Y direction), or an oblique direction inclined at a predetermined angle with respect to the horizontal direction or the vertical direction.

According to an embodiment, each of the first electrodes 120 may include a plurality of first sensing cells 122 arranged in the first direction, and a plurality of first connection units 124 connecting the first sensing cells 122 in the first direction. According to an embodiment, the first sensing cells 122 and the first connection units 124 may be integrally connected on the same layer on the substrate 110. Alternatively, according to an embodiment, the first sensing cells 122 and the first connection units 124 may be disposed on different layers on the substrate 110 and electrically connected to each other through a direct contact or an indirect contact.

According to an embodiment, the first sensing cells 122 may be formed of a transparent electrode material such as indium tin oxide (ITO), indium zinc oxide (IZO), indium tin zinc oxide (ITZO), or the like, and the first connection units 124 may be formed of a low resistance metal, but the sizes, areas, and/or widths thereof may be adjusted not to be visually recognized by a user. However, the present disclosure is not limited thereto, and a conductive material forming the first sensing cells 122 and/or the first connection units 124 may vary. For example, the first sensing cells 122 and/or the first connection units 124 may be embodied as a metal mesh electrode using an opaque metal material.

The second electrodes 130 may be disposed to be spaced apart from the first electrodes 120 in the active area 101 on the substrate 110 and extend in a second direction so as to cross the first electrodes 120. According to an embodiment, the second direction may be the vertical direction (the Y direction). However, the present disclosure is not limited thereto, and the second direction may be the horizontal direction (the X direction) or the oblique direction inclined at the predetermined angle with respect to the horizontal direction or the vertical direction.

According to an embodiment, each of the second electrodes 130 may include a plurality of second sensing cells 132 arranged in the second direction, and a plurality of second connection units 134 connecting the second sensing cells 132 in the second direction. According to an embodiment, the second sensing cells 132 and the second connection units 134 may be integrally connected on the same layer on the substrate 110. Alternatively, according to an embodiment, the second sensing cells 132 and the second connection units 134 may be disposed on different layers on the substrate 110 and electrically connected to each other through a direct contact or an indirect contact. According to an embodiment, the second sensing cells 132 and the second connection units 134 may be formed of a transparent electrode material such as indium tin oxide (ITO), indium zinc oxide (IZO), indium tin zinc oxide (ITZO), or the like. Meanwhile, the second sensing cells 132 and the second connection units 134 may not be necessarily formed of the transparent electrode material.

For example, the second sensing cells 132 and the second connection units 134 may be embodied as a metal mesh electrode using an opaque metal material.

In addition, according to an embodiment, at least one of the first and/or second electrodes 120 and 130, that is, the first sensing cells 122, the first connection units 124, the second sensing cells 132, and the second connection units 134 may include at least one of metals, an alloy thereof, a conductive polymer, and a conductive metal oxide. Examples of the metals forming the first and/or second electrodes 120 and 130 may include copper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), lead (Pb), and the like. When the first and/or second electrodes 120 and 130 are formed of an opaque metal, the size, area, and/or thickness thereof may be adjusted, or the first and/or second electrodes 120 and 130 may be embodied as a mesh pattern so that the second electrodes 120 and 130 may not be visually recognized by the user. Examples of the conductive polymer forming the first and/or second electrodes 120 and 130 may include polythiophene-based, polypyrrole-based, polyaniline-based, polyacetylene-based, and polyphenylene-based compounds, and a mixture thereof. More specifically, a PEDOT/PSS compound may be used among the polythiophene-based compounds. Examples of the conductive metal oxide forming the first and/or second electrodes 120 and 130 may include indium tin oxide (ITO), indium zinc oxide (IZO), antimony zinc oxide (AZO), indium tin zinc oxide (ITZO), zinc oxide (ZnO), tin oxide (SnO2), and the like. According to an embodiment, the first and/or second electrodes 120 and 130 may be formed of a single layer or a multiple layer.

The wires 140 may be disposed in the inactive area 102 adjacent to the active area 101. Each of the wires 140 may be electrically connected to at least one of the first electrodes 120 or the second electrodes 130. The wires 140 may connect the first electrodes 120 and the second electrodes 130 to the pad unit 150.

The wires 140 may be disposed in the inactive area 102 that is not visually recognized by the user, so that there may be a relatively wide choice of materials of the wires 140. For example, the wires 140 may be made of an opaque material having a low resistance such as molybdenum (Mo), silver (Ag), titanium (Ti), copper (Cu), aluminum (Al), molybdenum/aluminum/molybdenum (Mo/Al/Mo), and the like.

The pad unit 150 may include a plurality of pads 152. Each of the pads 152 may be electrically connected to at least one of the first electrodes 120 or at least one of the second electrodes 130. The pad unit 150 may be electrically connected to a sensor controller (not shown). Accordingly, driving signals and/or sensing signals for detecting a touch input may be transmitted and received through the pad unit 150.

As described above, the touch sensor 100 may be a capacitive touch sensor. When a touch input is provided by a hand of the user or a stylus pen, a capacitance between the first electrode 120 and the second electrode 130 may be changed at a position where the touch is input or at a peripheral portion thereof. Therefore, by monitoring a variation in capacitance between the first electrodes 120 and the second electrodes 130, whether or not the touch input is provided and the touch position may be sensed.

However, an embodiment of the present disclosure provides a touch sensor capable of sensing a touch pressure in addition to a touch position by using a variation in capacitance, and a display device having the same.

The touch sensor 100 according to an embodiment of the present disclosure may further include at least one pressure sensor (not shown) disposed at an intersection between at least one of the first electrodes 120 and at least one of the second electrodes 130. A more detailed description thereof will be described below.

Figure 2:
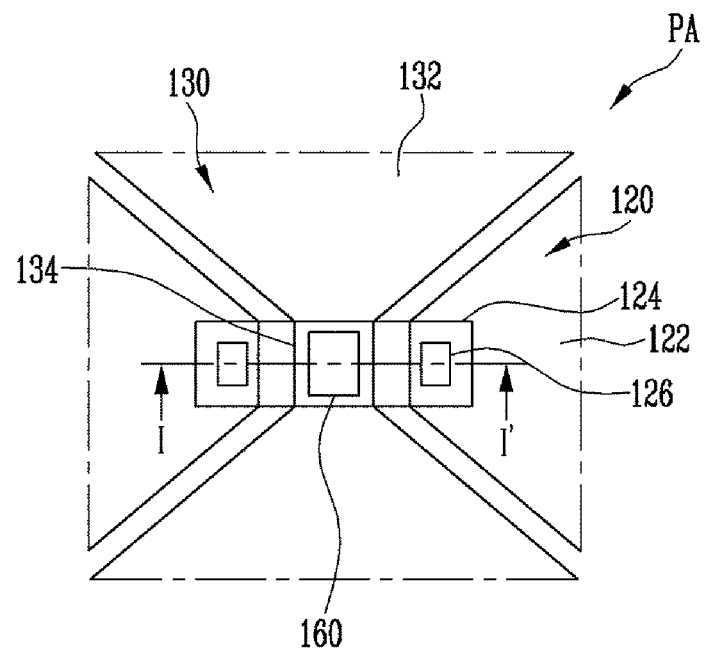
FIG. 2 is an enlarged view illustrating a portion of the touch sensor according to an embodiment of the present disclosure.

FIG. 2 is an enlarged view illustrating a portion of the touch sensor according to an embodiment of the present disclosure. Specifically, on the assumption that the pressure sensor is provided in at least one area (hereinafter, referred to as a "PA area") of the intersections between the first and second electrodes shown in FIG. 1, FIG. 2 is an enlarged view of the PA area. An intersection where the pressure sensor is not provided may have a configuration similar to or the same as the PA area shown in FIG. 2, except for the pressure sensor. Hereinafter, the structure of the touch sensor according to an embodiment of the present disclosure will be described with reference to FIGS. 1 and 2.

Referring to FIGS. 1 and 2, a pressure sensor 160 may be disposed at the intersection where the at least one of the first electrodes 120 crosses the at least one of the second electrodes 130, for example, the PA area.

According to an embodiment, the pressure sensor 160 may be formed of one or more conductive films. In the present disclosure, the material of the conductive film forming the pressure sensor 160 is not particularly limited. For example, the pressure sensor 160 may be formed of at least one of the above-described conductive electrode materials that form the first and/or second electrodes 120 and 130. In addition, the pressure sensor 160 may include an electrode material the same as or different from the conductive electrode material forming the first and second electrodes 120 and 130.

According to an embodiment, the pressure sensor 160 may be disposed between the first electrode 120 and the second electrode 130 disposed at the corresponding intersection. The pressure sensor 160 may be electrically connected to one of the first electrode 120 and the second electrode 130.

According to an embodiment, the pressure sensor 160 may be disposed on one surface of the second electrode 130 toward the first electrode 120, or on one surface of the first electrode 120 toward the second electrode 130. For example, the pressure sensor 160 may be disposed on one surface of the second connection unit 134 opposite to the first connection unit 124. Alternatively, the pressure sensor 160 may be disposed on one surface of the first connection unit 124 opposite to the second connection unit 134.

Although it is assumed that the pressure sensor 160 is disposed on only one surface of one of the first electrode 120 and the second electrode 130 in the present embodiment, the present disclosure is not limited thereto. For example, the pressure sensor 160 may be disposed on one surface of each of the first electrode 120 and the second electrode 130 opposite to each other in another embodiment.

According to an embodiment, the first sensing cells 122 constituting each of the first electrodes 120 may have patterns that are separated from each other and be electrically connected along the first direction by the first connection units 124. That is, the first electrodes 120 may extend along the first direction by a bridge connection structure. In addition, the second sensing cells 132 and the second connection units 134 constituting each of the second electrodes 130 may be integrally connected to each other.

The first sensing cells 122, the second sensing cells 132, and the second connection units 134 may be formed on the same layer on the substrate 110. However, since the first electrodes 120 and the second electrodes 130 are physically and/or electrically separated from each other, at least the first connection units 124 and the second connection units 134 may be formed on different layers on the substrate 110. In addition, an insulating film (not shown) and/or an air gap (not shown) may be interposed between the first connection units 124 and the second connection units 134. The insulating film and/or the air gap may be located at least at the intersection between the first and second electrodes 120 and 130, that is, between the first and second connection units 124 and 134. According to an embodiment, a plurality of insulating films and/or a plurality of air gaps may be dispersed in the active area 101 so as to be locally disposed only between the first and second connection units 124 and 134, or completely disposed between the first electrodes 120 and the second electrodes 130 (that is, completely in the active area 101).

When the first electrodes 120 extend along the first direction by the bridge connection structure, the first connection units 124 may be formed of a conductive material different from the first sensing cells 122. For example, the first connection unit 124 may be formed of a low-resistance metal material used for forming the wires 140. Although the first connection units 124 are formed of the opaque conductive material, the size, area, and/or thickness of the first connection units 124 may be adjusted so that the first connection units 124 may not be visually recognized by the user. However, the present disclosure is not limited thereto. For example, the first connection units 124 may be formed of the same material as the first sensing cells 122, for example, the transparent electrode material such as indium tin oxide (ITO), or the metal mesh in another embodiment.

In addition, the touch sensor 100 according to an embodiment of the present disclosure may further include third connection units 126 electrically connecting the first sensing cells 122 and the first connection units 124 to each other and arranged therebetween. For example, each of the first electrodes 120 may be disposed between the first sensing cells 122 and the first connection units 124 located on different layers to further include the third connection units 126 for electrically connecting the first sensing cells 122 and the first connection units 124 to each other.

According to an embodiment, the third connection units 126 may be integrally formed with the first sensing cells 122 or the first connection units 124. Alternatively, according to an embodiment, the third connection units 126 may be formed by performing an additional process using a different material from the first sensing cells 122 and the first connection units 124.

The structure of the touch sensor 100 according to an embodiment of the present disclosure is described with reference to FIG. 2 showing the structure in which the first sensing cells 122 and the second sensing cells 132 are arranged on the same layer by applying the bridge connection structure, but the present disclosure is not limited thereto. For example, the touch sensor 100 of the present disclosure may have the first sensing cells 122 and the second sensing cells 132 disposed on different layers and integrally connected to the first connection units 124 and the second connection units 134, respectively.

Figure 3:
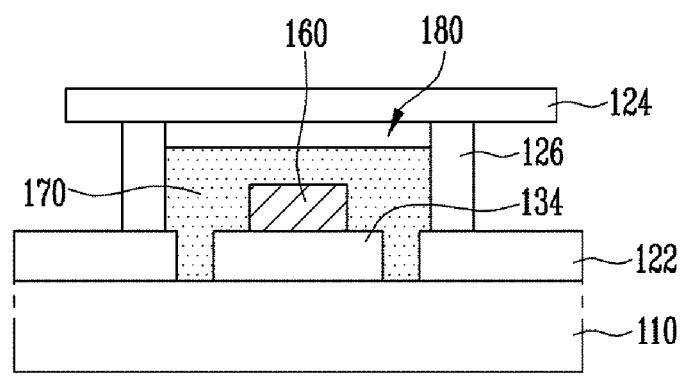
FIG. 3 is a cross-sectional view illustrating an example of a cross-section taken along line I-I' of FIG. 2.
Figure 4:
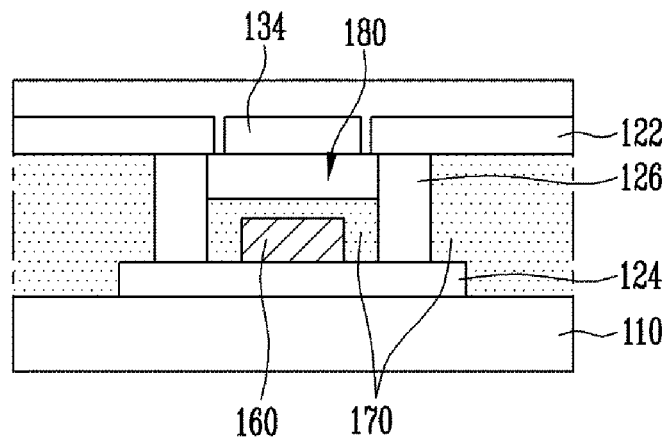
FIG. 4 is a cross-sectional view illustrating another example of the cross-section taken along line I-I' of FIG. 2.

FIG. 3 is a cross-sectional view illustrating an example of a cross-section taken along line I-I' of FIG. 2, and FIG. 4 is a cross-sectional view illustrating another example of the cross-section taken along line I-I' of FIG. 2. Hereinafter, the structure of the touch sensor according to an embodiment of the present disclosure will be described with reference to FIGS. 3 and 4 in conjunction with FIGS. 1 and 2. In the following description of FIGS. 3 and 4, a detailed description of the components described in FIGS. 1 and 2 will be omitted.

Referring to FIGS. 1 to 3, the first connection units 124 may be disposed on different layers from the first sensing cells 122, the second sensing cells 132, and the second connection units 134. For example, the first sensing cells 122, the second sensing cells 132, and the second connection units 134 may be disposed on a first layer on the substrate 110, and the first connection units 124 may be disposed on a second layer on the substrate 110. According to an embodiment, the first layer may be closer to the substrate 110 as compared to the second layer.

According to an embodiment, the first sensing cells 122 and the first connection units 124 may be electrically connected to each other by a plurality of third connection units 126 disposed between the first layer and the second layer. In a non-limiting embodiment of the present disclosure, the third connection units 126 may be made of a different material from the first sensing cells 122 and the first connection units 124.

For example, the third connection units 126 may be formed of a conductive filler, for example, a conductive buffer material including conductive nanoparticles and having elasticity. Examples of the nanoparticles may be nanotubes, nanocolumns, nanorods, nanopores, nanowires, and the like. The nanoparticles may include carbon, graphite, metalloid, metal, a conductive oxide of metalloid or metal, particles of a conductive nitride of metalloid or metal, particles in a core shell structure in which the particles are coated on insulating beads, or a combination thereof.

The metalloid included in the nanoparticles may include one of antimony (Sb), germanium (Ge), and arsenic (As) or an alloy thereof. The metal may be zinc (Zn), aluminum (Al), scandium (Sc), chromium (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide included in the nanoparticles may be indium tin oxide (ITO), indium zinc oxide (IZO), aluminum doped zinc oxide (AZO), gallium indium zinc oxide (GIZO), zinc oxide (ZnO), or mixtures thereof. According to an embodiment, the nanoparticles may be at least one of carbon nanotubes or silver nanowires, but the present disclosure is not limited thereto.

When the third connection units 126 are formed of a conductive buffer material, durability of the touch sensor 100 may be improved by reducing or absorbing an impact which may be applied to the first electrodes 120, the second electrodes 130, and the pressure sensor 160 and/or an insulating film 170 when a pressure caused by a touch input is applied. In addition, according to an embodiment, the third connection units 126 may be formed of a metal having high ductility.

In the case where the third connection units 126 are made of the conductive buffer material or a highly flexible material, when a pressure caused by a touch input is applied, the third connection units 126 may be bent in response to the degree of the pressure, and the distance between the connection units 124 and the pressure sensor 160 may be reduced. When the distance between the first connection units 124 and the pressure sensor 160 is reduced, the capacitance between the connection units 124 and the pressure sensor 160 may increase in response to the reduced distance. Accordingly, when a variation in capacitance due to the change in distance between the first connection units 124 and the pressure sensor 160 is detected, a touch pressure may be sensed.

According to an embodiment, the pressure sensor 160 may be disposed on one surface of the second connection unit 134 toward the first connection unit 124. For example, the pressure sensor 160 may be formed on one surface of the second connection unit 134 so as to be physically and electrically connected to the second connection unit 134.

However, the position of the pressure sensor 160 in the present disclosure may be variously changed. For example, the pressure sensor 160 may be located on one surface of the first connection unit 124 toward the second connection unit 134 and physically and electrically connected to the first connection unit 124.

According to an embodiment, the insulating film 170 may be interposed between at least the first connection units 124 and the second connection units 134, i.e., between the first and second electrodes 120 and 130. According to an embodiment, the insulating film 170 may be formed using a material selected from various insulating materials, such as a nitride film and an oxide film.

In addition, according to an embodiment, an air gap 180 may be further disposed between the first connection units 124 and the insulating film 170. When the air gap 180 is interposed between the first and second electrodes 120 and 130, in the case where the same touch pressure is applied, a change in distance between the pressure sensor 160 and the first connection unit 124 or the second connection unit 134 may be more easily made and the first electrodes 120, the second electrodes 130, the pressure sensor 160, and/or the insulating film 170 may be prevented from being damaged. However, the touch sensor 100 of the present disclosure is not limited to include the air gap 180 interposed between the first and second electrodes 120 and 130, and the air gap 180 may be omitted according an embodiment. For example, the insulating film 170 may completely fill a space between the first and second electrodes 120 and 130 at least at the intersection between the first and second electrodes 120 and 130, or another filler may be provided between the insulating film 170 and the first connection unit 124 or the second connection unit 134.

Referring to FIG. 4, according to an embodiment, the arrangement order of layers on which the first sensing cells 122 and the first connection units 124 are disposed may be changed. For example, the second layer on which the first connections 124 are disposed may be arranged closer to the substrate 110 as compared to the first layer on which the first sensing cells 122, the second sensing cells 132, and/or the first connection units 134 are disposed.

In addition, according to an embodiment, the insulating film 170 may be completely interposed between the first electrodes 120 and the second electrodes 130. At least a portion of the third connection units 126 may be embedded in a contact hole passing through the insulating film 170.

According to an embodiment, the pressure sensor 160 may be positioned on one surface of the first connection unit 124 toward the second connection unit 134.

In addition, according to an embodiment, the air gap 180 may be disposed between the insulating film 170 and the second connection unit 134 which are provided over the pressure sensor 160. However, the air gap 180 may be omitted. When the air gap 180 is omitted, the insulating film 170 may completely fill a space between the pressure sensor 160 and the second connection unit 134, or another filler may be provided therein.

According to an embodiment, the third connection units 126 may be a silicone composition including conductive nanoparticles and having elasticity. The conductive nanoparticles may be one of the nanoparticles listed above, for example, carbon nanotubes.

For example, the third connection units 126 may be a liquid silicone composition including conductive nanoparticles and an ionic liquid. For example, when the insulating film 170 is positioned so as to completely fill the space between the first and second electrodes 120 and 130, a contact hole may be formed through the insulating film 170 so that the first sensing cells 122 and the first connection units 124 may be connected to each other, and the liquid silicone composition including the conductive nanoparticles and the ionic liquid may be filled in the contact hole.

Figure 5:
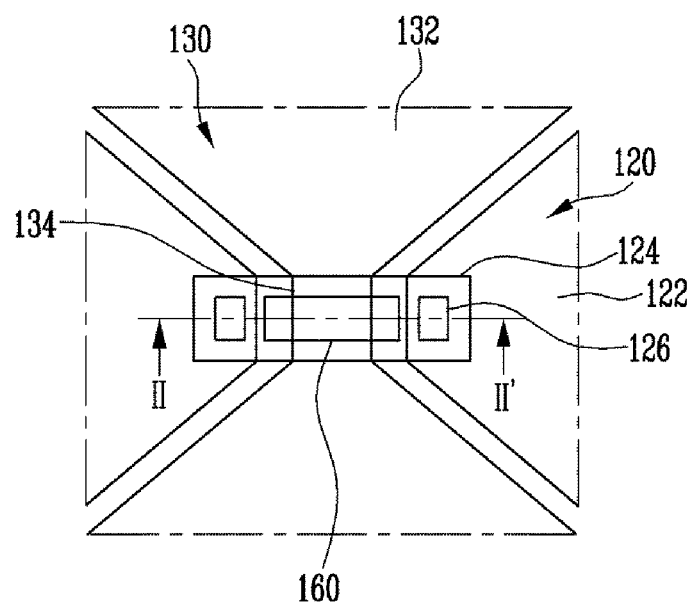
FIG. 5 is an enlarged view illustrating a portion of a touch sensor according to an embodiment of the present disclosure.
Figure 6:
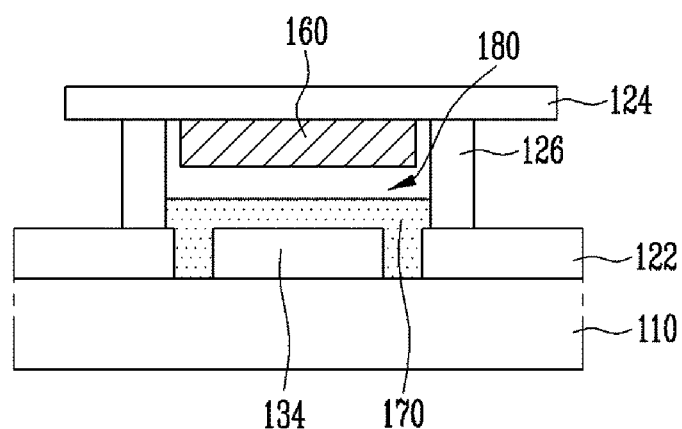
FIG. 6 is a cross-sectional view illustrating an example of a cross-section taken along line II-II' of FIG. 5.

FIG. 5 is an enlarged view illustrating the portion of the touch sensor according to an embodiment of the present disclosure, and FIG. 6 is a cross-sectional view illustrating an example of a cross-section taken along line II-II' of FIG.

5. In the following description of the embodiments of FIGS. 5 and 6, a detailed description of these embodiments similar to or same as the above-described embodiments will be omitted.

Referring to FIGS. 5 and 6, the position and/or the size of the pressure sensor 160 may be variously changed. For example, the position and/or the size of the pressure sensor 160 may be variously changed within a range in which a phenomenon that the pressure sensing sensor 160 is visually recognized by the user is prevented and stability of driving is secured.

According to an embodiment, when the first connection units 124 (sometimes called an upper bridge structure or a bridge connection structure) are disposed at a greater distance from the substrate 110 than the first and second sensing cells 122 and 132 and the second connection units 134, the pressure sensor 160 may be arranged on one surface of at least one of the first connection units 124 toward the second connection units 134. According to an embodiment, the size, area, and/or thickness of the pressure sensor 160 may be variously changed. For example, a horizontal length of the pressure sensor 160 may be greater than a horizontal length of the second connection unit 134 opposite to the pressure sensor 160 (i.e., a width of the second connection unit 134).

FIG. 5 shows that the first electrodes 120 to which the bridge connection structure is applied may be arranged in a horizontal direction (an X direction), and the second electrodes 130 crossing the first electrodes 120 may be arranged in a vertical direction (a Y direction), but the present disclosure is not limited thereto. For example, the first electrodes 120 to which the bridge connection structure is applied may be arranged in the vertical direction (the Y direction), and the second electrodes 130 crossing the first electrodes 120 may be arranged in the horizontal direction (the X direction). That is, the first electrodes 120 and the second electrodes 130 may be arranged in a direction in which FIG. 5 is rotated 90 degrees.

Further, according to the embodiment, an arrangement direction (for example, a vertical direction) of the pressure sensor 160 may be changed. For example, the pressure sensor 160 may be arranged so that the horizontal length may be greater than the vertical length, or the vertical length is greater than the horizontal length. In addition, according to an embodiment, the pressure sensor 160 may be disposed in an oblique direction.

That is, according to the present disclosure, the arrangement structure and/or arrangement direction of the first electrodes 120, the second electrodes 130, and/or the pressure sensor 160 may be variously changed.

Figure 7:
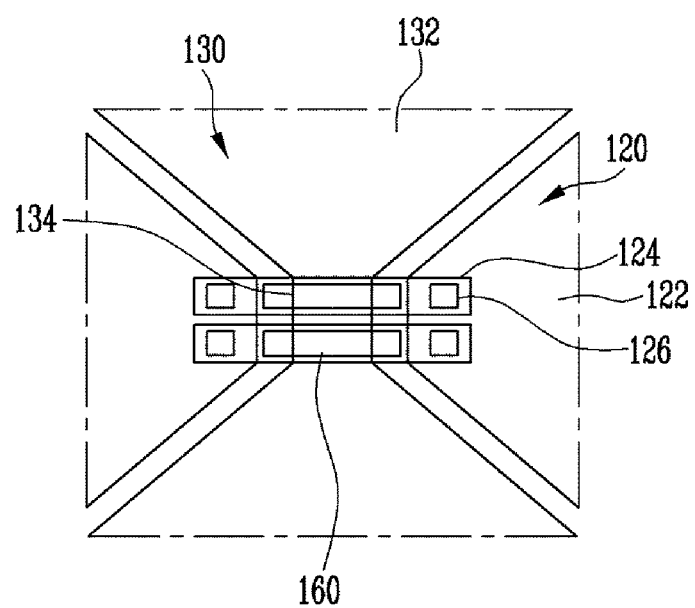
FIG. 7 is an enlarged view illustrating the portion of the touch sensor according to an embodiment of the present disclosure.

FIG. 7 is an enlarged view illustrating a portion of the touch sensor according to an embodiment of the present disclosure. In the following description of the embodiment of FIG. 7, a detailed description of portions of the embodiment of FIG. 7 similar to or same as the above-described embodiments will be omitted.

Referring to FIG. 7, the sizes and/or numbers of first connection units 124 and/or pressure sensors 160 may be variously changed. For example, the sizes and/or numbers of first connection units 124 and/or pressure sensors 160 may be variously changed so that a touch input may be more easily detected within the range in which visual recognition by the user is prevented and driving stability is secured.

For example, the plurality of first connection units 124 may be connected between two adjacent first sensing cells 122. According to an embodiment, when two first connection units 124 are connected between the two adjacent first sensing cells 122, the pressure sensor 160 may be disposed on surfaces of the two first connection units 124. Alternatively, according to an embodiment, a plurality of pressure sensors 160 may be disposed at least one intersection between the first connection unit 124 and the second connection unit 134 crossing each other.

Figure 8A:
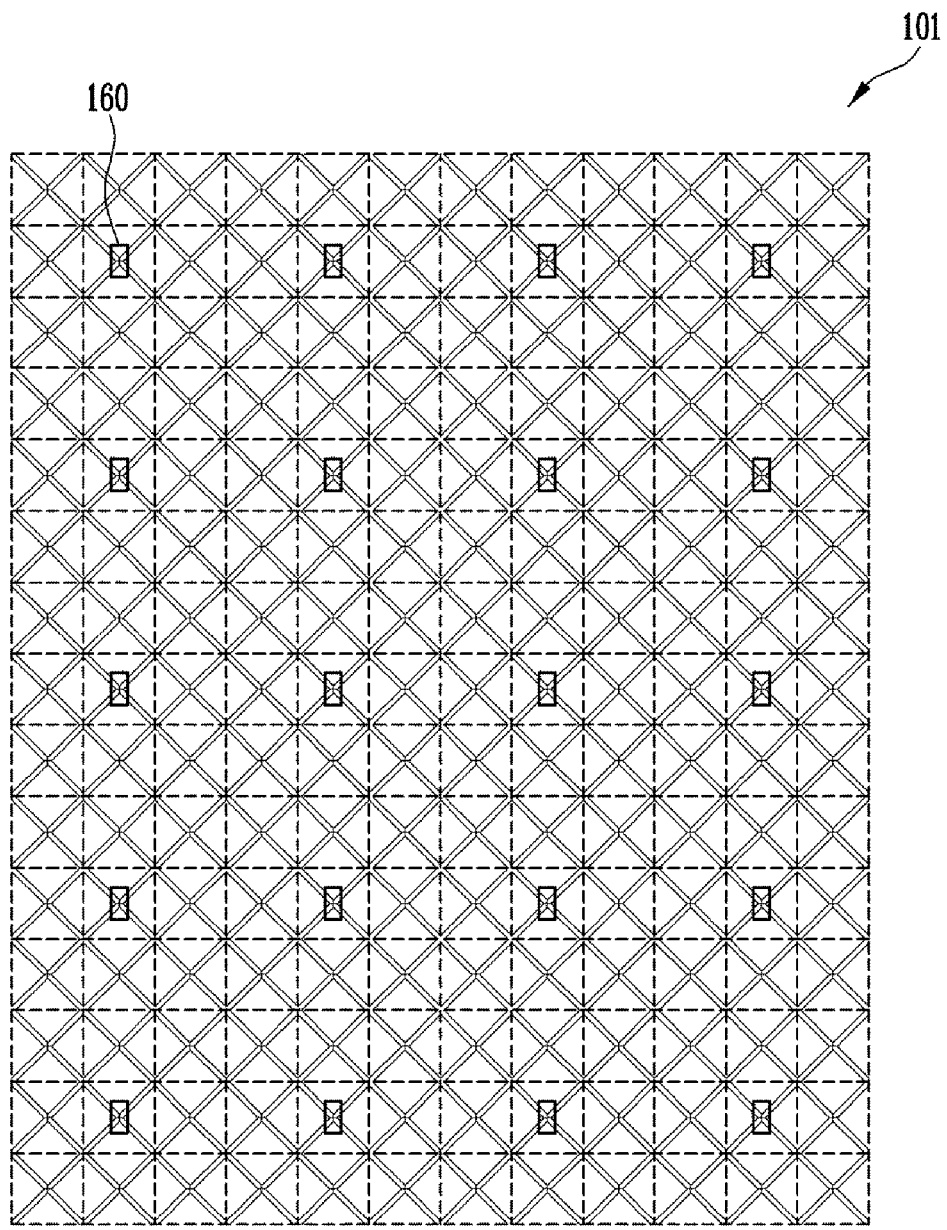
FIGS. 8A and 8B are views illustrating an arrangement structure of a pressure sensor according to an embodiment of the present disclosure.
Figure 8B:
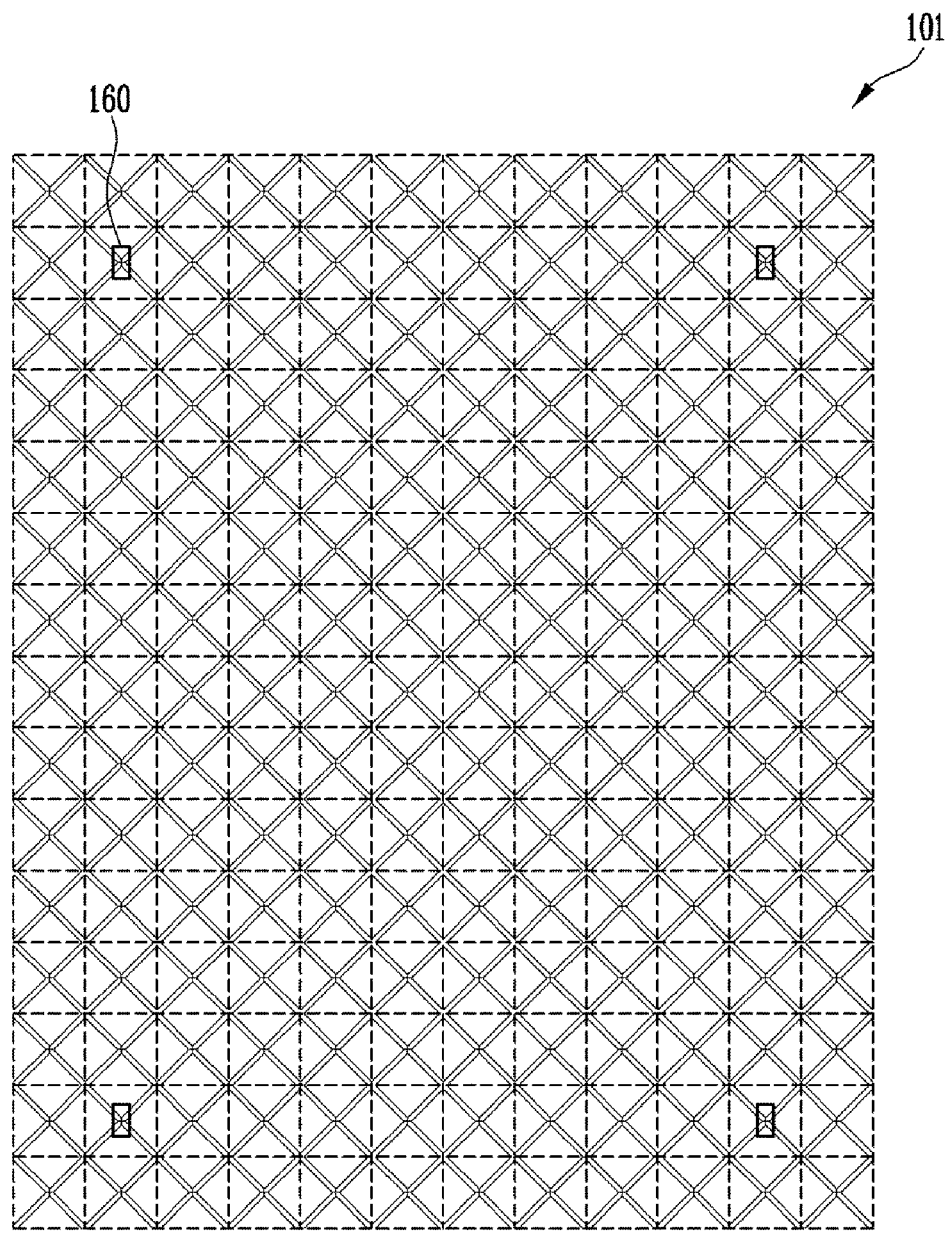

FIGS. 8A and 8B are views illustrating an arrangement structure of a pressure sensor according to an embodiment of the present disclosure. In FIGS. 8A and 8B, the size of the pressure sensor is exaggerated compared to the other components to explicitly show the pressure sensor.

Referring to FIGS. 8A and 8B, a plurality of pressure sensors 160 may be disposed in the active area 101 according to an embodiment. According to an embodiment, the pressure sensors 160 may be arranged at various locations and/or with a density per unit area within the active area 101. In addition, FIGS. 8A and 8B show that the pressure sensors 160 are regularly dispersed in the active area 101. However, the present disclosure is not limited thereto. For example, the pressure sensors 160 may be irregularly dispersed within the active area 101.

Depending on the number and/or size of the pressure sensors 160, reliability and accuracy of pressure sensing may vary. Accordingly, the number and/or size of the pressure sensors 160 may be set in conformity with respective product specific requirements.

In addition, when the plurality of pressure sensors 160 are disposed in the active area 101, multi-pressure sensing in response to a multi-touch may be possible. For example, the multi-touch sensing in response to the multi-touch may be possible by applying a mutual capacitance method of sensing the multi-touch to pressure sensing.

For example, when the plurality of pressure sensors 160 are electrically connected to at least a portion of the second electrodes 130, driving signals may be supplied to the first electrodes 120 during a predetermined pressure sensing period. During the predetermined pressure sensing period, sensing signals at least from the second electrodes 130 connected to the pressure sensors 160 may be received, and the sensing signals may be compared with sensing signals received during a previous pressure sensing period or a subsequent pressure sensing period to sense whether or not the touch pressure is applied, and/or the intensity of the touch pressure. A position where the touch pressure is sensed, that is, coordinate information, may be detected by using position information of the first electrode 120 and the second electrode 130 at a position where a capacitance is changed. Further, although the touch pressure is detected at a plurality of positions, the multi-pressure in response to the multi-touch may be sensed by detecting a variation in capacitance at each position.

Figure 9A:
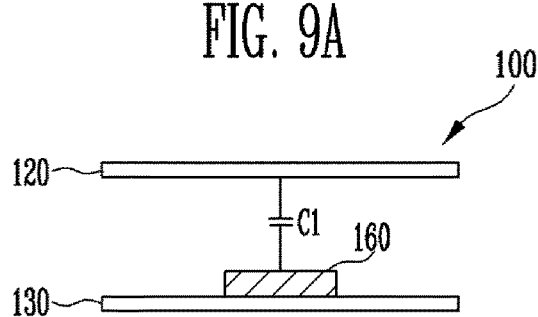
FIGS. 9A and 9B are views showing an operation of the pressure sensor according to an embodiment of the present disclosure.
Figure 9B:
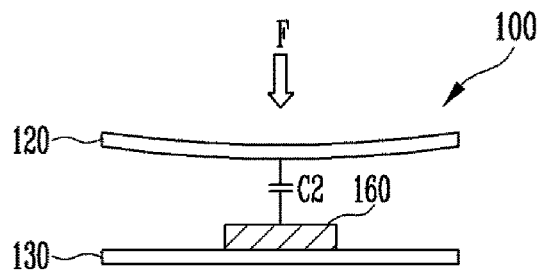

FIGS. 9A and 9B are views showing an operation of the pressure sensor according to an embodiment of the present disclosure. For convenience of explanation, FIGS. 9A and 9B schematically show that a variation in capacitance is generated in response to application of a pressure at one intersection where the pressure sensor 160 is formed, among the intersections between the first and second electrodes 120 and 130. Specifically, FIG. 9A shows that no pressure is applied to the touch sensor, and FIG. 9B shows that a pressure is applied to the touch sensor. FIGS. 9A and 9B illustrate an embodiment in which the pressure sensor 160 is disposed on a second connection unit of a second electrode, but the present disclosure is not limited thereto.

Referring to FIG. 9A, when a pressure F is not applied to the touch sensor 100, a first capacitance C1 may be formed between the first electrode 120 and the second electrode 130 where the pressure sensor 160 is disposed. According to an embodiment, one of the first electrode 120 and the second electrode 130 may be a driving electrode (for example, a Tx electrode) receiving a driving signal for detecting a variation in the capacitance, and the other may be a sensing electrode (for example, an Rx electrode) outputting a sensing signal detecting the variation in the capacitance.

When a driving signal (a sampling signal) for detecting a touch is applied to one of the first electrode 120 and the second electrode 130, a sensing signal having a magnitude corresponding to the drive signal may be output from the other electrode. That is, the touch sensor 100 according to an embodiment of the present disclosure may be embodied as a mutual capacitive touch sensor, but the present disclosure is not limited thereto.

Referring to FIG. 9B, when the pressure F is applied to the touch sensor 100 according to a user's touch or the like, a distance between the first electrode 120 and the second electrode 130 on which the pressure sensor 160 is disposed may be changed. Accordingly, a capacitance between the first electrode 120 and the second electrode 130 on which the pressure sensor 160 is disposed may be changed. For example, the first capacitance C1 may be changed to a second capacitance C2 by the applied pressure F. When the driving signal (the sampling signal) for touch detection is applied to one of the first electrode 120 and the second electrode 130, a sensing signal reflecting the variation in capacitance may be output from the other electrode.

That is, a mutual capacitance between the first electrode 120 and the second electrode 130 on which the pressure sensor 160 is disposed may be changed corresponding to the pressure F applied from an outside. Therefore, the intensity of the pressure F may be detected by detecting the variation in capacitance before and after the touch is input.

Figure 10:
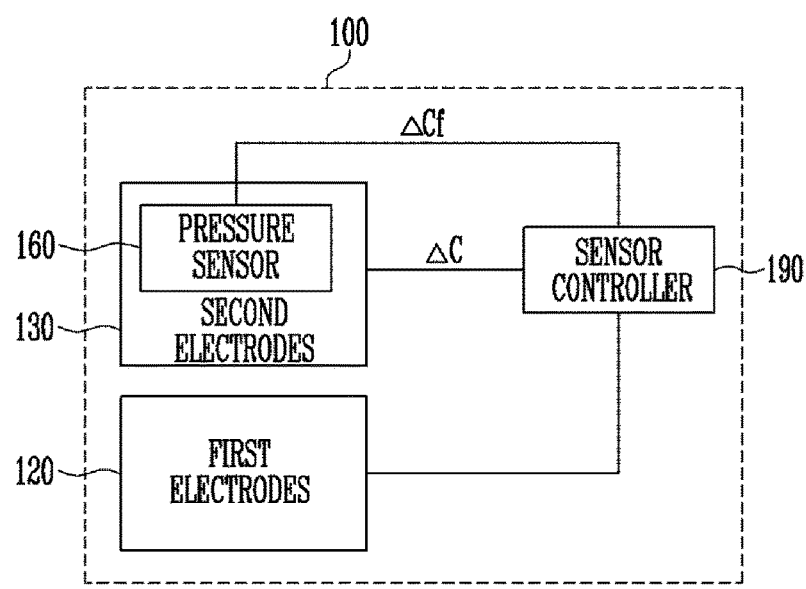
FIG. 10 is a view illustrating a touch sensor including a sensor controller according to an embodiment of the present disclosure.
Figure 11:
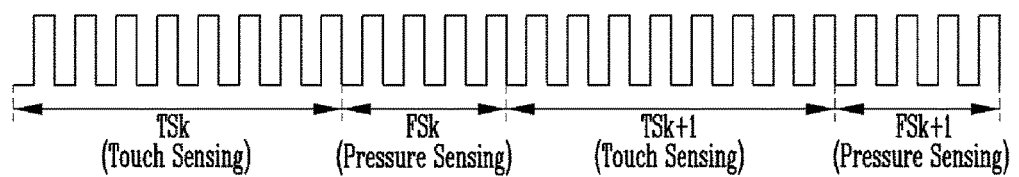
FIG. 11 is a view showing a driving method of a touch sensor according to an embodiment of the present disclosure.

FIG. 10 is a view illustrating a touch sensor including a sensor controller 190 according to an embodiment of the present disclosure, and FIG. 11 is a view showing a driving method of the touch sensor according to an embodiment of the present disclosure.

Referring to FIG. 10, the touch sensor 100 according to an embodiment of the present disclosure may include the sensor controller 190 electrically connected to the first electrodes 120 and the second electrodes 130. According to an embodiment, one or more pressure sensors 160 may be electrically connected to at least one of the second electrodes 130 and electrically connected to the sensor controller 190 by the at least one of the second electrodes 130.

According to an embodiment, the sensor controller 190 may detect a capacitance variation ΔC between the first electrodes 120 and the second electrodes 130 during a predetermined touch sensing period (a first period) to thereby sense the touch position. In addition, the sensor controller 190 may detect a capacitance variation ΔCf between the first electrode 120 and the second electrode 130 crossing with each other in an area where the pressure sensor 160 is positioned for a predetermined pressure sensing period (a second period, sometimes called a force sensing period) to thereby sense the touch pressure.

According to an embodiment, a pressure sensing period may be completely separate from a touch sensing period, or the pressure sensing period and the touch sensing period may at least partially overlap with each other. For example, as shown in FIG. 11, the touch sensing period and the pressure sensing period may be separated from each other and alternately arranged. Further, according to an embodiment, the pressure sensing period may be only inserted between at least some of a plurality of touch sensing periods.

Referring to FIG. 11, a kth (k is a natural number) pressure sensing period FSk may be provided between a kth touch sensing period TSk and a (k+1)th touch sensing period TSk+1, and a (k+1)th pressure sensing period FSk+1 may be inserted immediately after the (k+1)th touch sensing period TSk+1. That is, according to an embodiment, the kth (k is a natural number) touch sensing period TSk, the kth pressure sensing period FSk, the (k+1)th touch sensing period TSk+1, and the (k+1)th pressure sensing period FSk+1 may be sequentially arranged.

According to an embodiment, durations of the touch sensing periods TSk and TSk+1 and the pressure sensing periods FSk and FSk+1 may be differently set. For example, durations of the pressure sensing periods FSk and FSk+1 may be shorter than those of the touch sensing periods TSk and TSk+1. However, the present disclosure is not limited thereto. For example, the durations of the touch sensing periods TSk and TSk+1 and the durations of the pressure sensing periods FSk and FSk +1 may be the same as each other.

Further, according to an embodiment, the number of pressure sensing periods FSk and FSk+1 may be changed. For example, the pressure sensing periods FSk and FSk+1 may be arranged immediately after each of the touch sensing periods TSk and TSk+1 is provided, or the pressure sensing periods FSk and FSk+1 may be arranged only after a part of the touch sensing periods TSk and TSk+1.

During the touch sensing periods TSk and TSk+1, for example, the sensor controller 190 may supply driving signals (sampling signals) to the first electrodes 120 and receive sensing signals corresponding to the driving signals from the second electrodes 130. The sensor controller 190 may sense whether or not the touch is input and the position of the touch input by detecting the capacitance variation ΔC between the first electrodes 120 and the second electrodes 130. More specifically, when the touch is input, since the capacitance is changed at a point where the touch input is provided or its periphery, whether the touch is input or the position of touch input may be detected by analyzing the sensing signal corresponding to the driving signal. According to an embodiment, the durations of the touch sensing periods TSk and TSk+1 may be set to long enough to sense the touch input, and to satisfy a predetermined response speed.

During the pressure sensing periods FSk and FSk+1, for example, the sensor controller 190 may supply driving signals (sampling signals) to the first electrodes 120 and receive sensing signals from at least a portion of the second electrodes 130. For example, the sensor controller 190 may receive sensing signals only from one or more second electrodes 130 electrically connected to the pressure sensor 160 during the pressure sensing periods FSk and FSk+1. The sensor controller 190 may detect the capacitance variation ΔCf between one or more second electrodes 130 connected to the pressure sensor 160 and the first electrodes 120.

For example, the sensor controller 190 may compare the sensing signals received from one or more second electrodes 130 connected to the pressure sensor 160 during the kth pressure sensing period FSk with the sensing signals received from one or more second electrodes 130 connected to the pressure sensor 160 during the (k+1)th pressure sensing period FSk+1, and detect the capacitance variation ΔCf to sense whether or not the touch pressure is applied and/or the intensity of the touch pressure. The kth pressure sensing period FSk may be a period in which the pressure sensing in response to the touch input may be started, and the (k+1)th pressure sensing period FSk+1 may be a period in which pressure sensing in response to the touch input may be terminated. However, the number of times of sensing a pressure may vary depending on an embodiment.

Further, according to an embodiment, the period in which the pressure sensing in response to the touch input may be started, that is, the kth pressure sensing period FSk and the period in which the pressure sensing in response to the touch input may be terminated, that is, the (k+1)th pressure sensing period FSk+1 may be arranged at an interval of a plurality of touch sensing periods TS. For example, the kth pressure sensing period FSk and the (k+1)th pressure sensing period FSk+1 may be arranged with an interval enough to sense the pressure.

Figure 12:
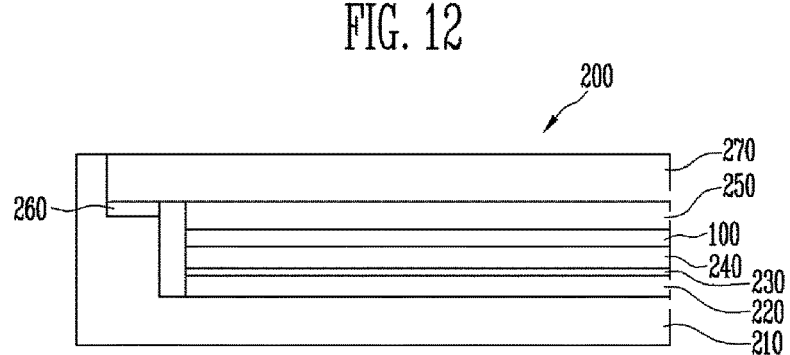
FIG. 12 is a view illustrating a display device according to an embodiment of the present disclosure.

FIG. 12 is a view illustrating a display device according to an embodiment of the present disclosure.

Referring to FIG. 12, a display device 200 according to an embodiment of the present disclosure may include a display panel 220, a touch sensor 100 disposed in or around the display panel 220, and a bracket 210 for accommodating at least the display panel 220 and the touch sensor 100. In FIG. 12, the display panel 220 and the touch sensor 100 may be sequentially stacked on a bottom surface of the bracket 210, but a stacking order thereof may be changed.

According to an embodiment, the display device 200 may further include a window 270 positioned above (above one surface where an image is displayed) the display panel 220 and the touch sensor 100. In addition, the display device 200 may further include at least one of a polarizing plate 230 disposed on one surface of the display panel 220, specifically on one surface where an image is displayed, a first adhesive member 240 disposed between the display panel 220 and the touch sensor 100, a second adhesive member 250 disposed between the touch sensor 100 and the window 270, and a third adhesive member 260 disposed between a step portion of the bracket 210 disposed under an edge of the window 270 and the window 270.

According to an embodiment, the touch sensor 100 may be positioned on one surface where the image is displayed to overlap the display panel 220, between both surfaces (an upper surface and a lower surface) of the display panel 220. However, the present disclosure is not limited thereto. For example, the touch sensor 100 may be integrally formed with the display panel 220. For example, the touch sensor 100 may be integrated with the display panel 220 using at least one of an upper substrate and a lower substrate constituting the display panel 220 as a base member. The touch sensor 100 may be integrated with other components of the display device 200 such as the polarizing plate 230, the window 270, and the like according to an embodiment of the present disclosure.

In the above-described display device 200, the touch sensor 100 may be a touch sensor to which at least one of the embodiments described above with reference to FIGS. 1 to 11 is applied. The display device 200 may sense the touch pressure in addition to the touch position. In addition, when the touch sensor 100 includes the plurality of pressure sensors 160 dispersed at a plurality of positions, the display device 200 may also provide a multi-pressure sensing function in response to the multi-touch.

According to an embodiment of the present disclosure, a touch sensor capable of sensing a touch pressure in addition to a touch position, and a display device having the same may be provided. In addition, according to an embodiment of the present disclosure, multi-pressure sensing in response to a multi-touch may also be allowed.

Embodiments are provided to more sincerely and fully disclose the disclosure and to completely transfer the spirit of the disclosure to those skilled in the art to which the disclosure pertains, and the scope of the disclosure should be understood by the claims of the disclosure. Accordingly, it will be understood by those of skill in the art that various changes in form and details may be made without departing from the spirit and scope of the disclosure as set forth in the following claims.

Although the present disclosure has been described in reference to the embodiments shown in the drawings, it will be understood by a person of ordinary skill in the art that various modifications and equivalents may be made. Therefore, the true technical protection scope of the present disclosure will be defined by the technical spirit within the scope of claims.

What is claimed is:

1. A touch sensor, comprising:
a plurality of first electrodes extending in a first direction;
a plurality of second electrodes spaced apart from the plurality of first electrodes and extending in a second direction to cross the plurality of first electrodes;
at least one pressure sensor arranged at an intersection between at least one of the plurality of first electrodes and at least one of the plurality of second electrodes; and
a sensor controller electrically connected to the plurality of first electrodes, the plurality of second electrodes, and the pressure sensor,
wherein the sensor controller is configured to detect a variation in capacitance between the plurality of first electrodes and the plurality of second electrodes to sense a touch position during a first period and detect a variation in capacitance between the at least one of the plurality of first electrodes or the at least one of the plurality of second electrodes and the pressure sensor to sense a touch pressure during a second period.

2. The touch sensor of claim 1, wherein each of the first electrodes includes a plurality of first sensing cells arranged in the first direction on a first layer and a plurality of connection units connecting the plurality of first sensing cells in the first direction and arranged on a second layer, and
each of the second electrodes includes a plurality of second sensing cells arranged in the second direction and a plurality of second connection units connecting the plurality of second sensing cells in the second direction and arranged on the first layer.

3. The touch sensor of claim 2, further comprising third connection units arranged between the first layer and the second layer, electrically connecting the first sensing cells and the first connection units, and formed of a different material from the first sensing cells and the first connection units.

4. The touch sensor of claim 3, wherein the third connection units are conductive buffer materials including conductive fillers.

5. The touch sensor of claim 3, wherein the third connection units are a silicon composition including conductive nanoparticles.

6. The touch sensor of claim 2, further comprising:
an insulating film disposed between the first connection units and the second connection units; and
an air gap arranged between the first connection units or the second connection units and the insulating film.

7. The touch sensor of claim 2, wherein the second sensing cells are arranged on the first layer and integrally connected with the second connection units.

8. The touch sensor of claim 1, wherein the pressure sensor is arranged between the at least one of the first electrodes and the at least one of the second electrodes and electrically connected to the at least one of the first electrodes or the at least one of the second electrodes.

9. The touch sensor of claim 8, wherein the pressure sensor is arranged on one surface of the at least one of the second electrodes towards the at least one of the first electrodes.

10. The touch sensor of claim 1, wherein the pressure sensor is electrically connected to the at least one of the second electrodes.

11. The touch sensor of claim 10, wherein the sensor controller is configured to supply driving signals to the first electrodes and receive sensing signals from the second electrodes during the first period, and supply driving signals to the first electrodes and receive a sensing signal from the at least one of the second electrodes connected to the pressure sensor during the second period.

12. The touch sensor of claim 10, wherein the sensor controller is configured to compare a sensing signal received from the at least one of the second electrodes during a kth second period with a sensing signal received from the at least one of the second electrodes during a (k+1)th second period to sense the touch pressure, where k is a natural number.

13. A display device, comprising:
a display panel; and
a touch sensor arranged in or around the display panel, wherein the touch sensor comprises:
a plurality of first electrodes extending in a first direction;
a plurality of second electrodes spaced apart from the plurality of first electrodes and extending in a second direction to cross the plurality of first electrodes;
at least one pressure sensor arranged at an intersection between at least one of the plurality of first electrodes and at least one of the plurality of second electrodes; and
a sensor controller electrically connected to the plurality of first electrodes, the plurality of second electrodes, and the pressure sensor,
wherein the sensor controller is configured to detect a variation in capacitance between the at least one of the plurality of first electrodes or the at least one of the plurality of second electrodes and the pressure sensor to sense a touch pressure during a pressure sensing period.

14. The display device of claim 13, wherein the sensor controller is configured to detect a variation in capacitance between the first electrodes and the second electrodes to sense a touch position during a touch sensing period.

15. The display device of claim 14, wherein the pressure sensing period and the touch sensing period are alternately arranged.

16. The display device of claim 13, wherein the sensor controller is configured to supply driving signals to the first electrodes or the second electrodes during a kth pressure sensing period and a (k+1)th pressure sensing period, respectively, where k is a natural number, detect a variation in capacitance between the at least one of the first electrodes or the at least one of the second electrodes and the pressure sensor, and sense the touch pressure in response to the variation in the capacitance.

17. The display device of claim 13, wherein each of the first electrodes includes a plurality of first sensing cells arranged in the first direction on a first layer and a plurality of connection units connecting the plurality of first sensing cells in the first direction and arranged on a second layer,
each of the plurality of second electrodes includes a plurality of second sensing cells arranged in the second direction and arranged on the first layer and a plurality of second connection units connecting the plurality of second sensing cells in the second direction and arranged on the first layer, and
the touch sensor further includes an insulating film disposed between the plurality of first connection units and the plurality of second connection units and a plurality of third connection units arranged between the first layer and the second layer and electrically connecting the plurality of first sensing cells and the plurality of first connection units.

18. The display device of claim 17, wherein the third connection units are formed of a different material from the first sensing cells and the first connection units.

* * * * *